United States Patent
Baeuerle et al.

(10) Patent No.: US 6,928,819 B2
(45) Date of Patent: Aug. 16, 2005

(54) METHOD AND ARRANGEMENT FOR CONTROLLING THE CHARGE PRESSURE OF AN EXHAUST-GAS TURBOCHARGER

(75) Inventors: Michael Baeuerle, Ditzingen-Heimerdingen (DE); Carsten Reisinger, Stuttgart (DE); Guido Porten, Enzweihingen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 10/355,054

(22) Filed: Jan. 31, 2003

(65) Prior Publication Data
US 2003/0140630 A1 Jul. 31, 2003

(30) Foreign Application Priority Data

| Jan. 31, 2002 | (DE) | 102 03 982 |
| Oct. 14, 2002 | (DE) | 102 47 898 |
| Jan. 23, 2003 | (DE) | 103 02 453 |

(51) Int. Cl.[7] .......... F02B 37/04; F02B 37/12; F02B 39/10; F02B 33/44
(52) U.S. Cl. .......... 60/612; 600/602; 600/607; 600/609; 123/562
(58) Field of Search .......... 60/612, 600, 602, 60/607, 608, 609; 123/562

(56) References Cited

U.S. PATENT DOCUMENTS

| 5,771,868 | A | * | 6/1998 | Khair | 60/609 |
| 6,079,211 | A | * | 6/2000 | Woollenweber et al. | 60/612 |
| 6,637,205 | B1 | * | 10/2003 | Ahmad et al. | 60/608 |
| 6,722,129 | B2 | * | 4/2004 | Criddle et al. | 60/612 |
| 6,729,124 | B2 | * | 5/2004 | Baeuerle et al. | 60/285 |
| 2004/0194465 | A1 | * | 10/2004 | Bolz et al. | 60/612 |

* cited by examiner

Primary Examiner—Sheldon J Richter
(74) Attorney, Agent, or Firm—Walter Ottesen (57) ABSTRACT

The invention is directed to a method and an arrangement for controlling the charging pressure of an exhaust-gas turbocharger (1) wherein a charging pressure actual value (pvdkds) is tracked to a charging pressure desired value (plsoll). The charging pressure of the exhaust-gas turbocharger (1) is controlled in dependence upon a characteristic variable of an electric auxiliary charger (5). The electric auxiliary charger (5) coacts with the exhaust-gas turbocharger (1) for compressing the inducted air. In this way, an unnecessary opening of a bypass valve of the exhaust-gas turbocharger (1) is avoided.

10 Claims, 5 Drawing Sheets

METHOD AND ARRANGEMENT FOR CONTROLLING THE CHARGE PRESSURE OF AN EXHAUST-GAS TURBOCHARGER

FIELD OF THE INVENTION

The invention relates to a method and an arrangement for controlling the charging pressure of an exhaust-gas turbocharger.

BACKGROUND OF THE INVENTION

It is already known to track the charging pressure actual value of an exhaust-gas value of an exhaust-gas turbocharger to a charging pressure desired value by means of a control.

In present day internal combustion engines equipped with exhaust-gas turbocharging, a control of the charging pressure takes place via a bypass to the turbine of the exhaust-gas turbocharger.

It is furthermore known to provide an electric auxiliary compressor or electric auxiliary charger in addition to the exhaust-gas turbocharger. The auxiliary compressor or auxiliary charger makes possible an additional increase of the charging pressure.

SUMMARY OF THE INVENTION

The method of the invention is for controlling the charge pressure of an exhaust-gas turbocharger and includes the steps of: causing a charge pressure actual value (pvdkds) to track a charge pressure desired value (plsoll); and, controlling the charge pressure of the exhaust-gas turbocharger in dependence upon a characteristic quantity of an electric auxiliary charger coacting with the exhaust-gas turbocharger to compress the inducted air.

The method of the invention and the arrangement of the invention afford the advantage with respect to the above that the charging pressure of the exhaust-gas turbocharger is controlled in dependence upon a characteristic quantity of an electric auxiliary charger which coacts with the exhaust-gas turbocharger for compressing the inducted air. In this way, the opening of the bypass to the turbine of the exhaust-gas turbocharger can be adjusted to a minimum required value and an unnecessary activation of the electric auxiliary charger or of the electric auxiliary compressor is prevented.

Advantageous possibilities for selecting the characteristic quantity are present in the use of the charging pressure of the electric auxiliary charger or of the compressor pressure ratio across the electric auxiliary charger.

An especially simple possibility for considering the charging pressure of the electric auxiliary charger results when this charging pressure is used for correcting an input variable of the control.

A further advantage is that a regenerative feedback effect of the electric auxiliary charger on the pressure ratio of the exhaust-gas turbocharger is considered. In this way, the influence of the electric auxiliary charger on the compression of the exhaust-gas turbocharger is considered in the control of the charging pressure of the exhaust-gas turbocharger.

A further advantage is that a corrected charging pressure of the electric auxiliary charger is determined via multiplication of a regenerative feedback factor by the charging pressure of the electric auxiliary charger and the regenerative feedback factor is adapted to the particular operating point of the electric auxiliary charger and of the exhaust-gas turbocharger. Adaptation is especially by means of a characteristic field. The above-mentioned corrected charging pressure considers the regenerative feedback effect. In this way, the regenerative feedback effect can be especially precisely considered at several operating points of the electric auxiliary charger and of the exhaust-gas turbocharger.

The direct application of the compressor charging ratio to the correction of the charging pressure desired value or the charging pressure actual value is the most simple for the control. This requires the least complexity with respect to computation.

It is also advantageous when a corrected compressor pressure ratio of the auxiliary charger, which considers the regenerative feedback effect, is determined by multiplication of a regenerative feedback factor with the compressor pressure ratio of the electric auxiliary charger. Here, the compressor pressure ratio of the electric auxiliary charger is limited especially to the pressure increase thereof. In this way, a more precise simulation of the effect of the electric auxiliary charger is achieved.

A further advantage is that the electric auxiliary charger is switched off when the charging pressure desired value is exceeded by the charging pressure actual value modified by the charging pressure of the electric auxiliary charger. In this way, an unnecessary operation of the electric auxiliary compressor or of the electric auxiliary charger is prevented and energy saved.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
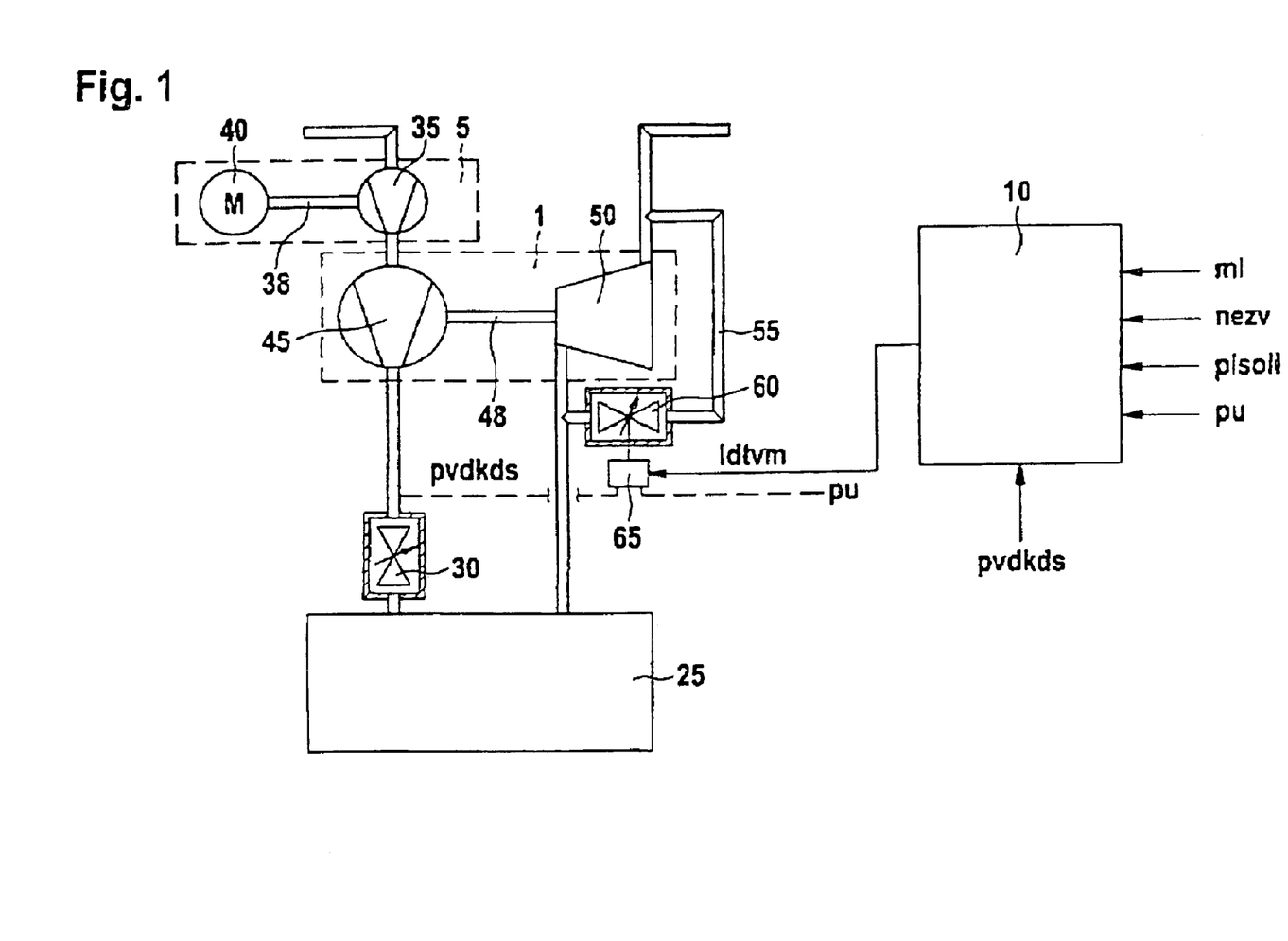
FIG. 1 is a block circuit diagram of a charging pressure control of an exhaust-gas turbocharger in accordance with the invention.

In FIG. 1, reference numeral 25 identifies an internal combustion engine. Fresh air is supplied to the engine 25 via an electric auxiliary compressor, or electric auxiliary charger 5, an exhaust-gas turbocharger 1 and a throttle flap 30. A compressor 35 of the electric auxiliary charger 5 is driven by a motor 40 via a first shaft 38 at an rpm (nezv) which is constant in this example. A compressor 45 of the exhaust-gas turbocharger 1 is driven via a second shaft 48 by a turbine 50 of the exhaust-gas turbocharger 1. The turbine 50 is driven by the exhaust-gas flow of the engine 25. A so-called bypass 55 is connected in parallel with the turbine 50. A valve 60 is mounted in the bypass and is characterized as a waste gate. If the valve 60 is closed, then the exhaust gas is conducted completely through the turbine 50. If the valve 60 is opened, then at least a portion of the exhaust-gas flow is led past the turbine 50. This leads to a reduced power at the second shaft 48 and therefore to a reduction of the compressor pressure ratio of the compressor 45 of the exhaust-gas turbocharger 1. The valve 60 can be opened via a vacuum unit 65. For this purpose, an actuating signal is supplied to the vacuum unit 65 which effects the adjustment of a pressure at the vacuum unit 65 via a pulse-duty factor. This pressure lies between the ambient pressure pu and a charger pressure actual value pvdkds at the output of the exhaust-gas turbocharger 1 and at the input of the throttle flap 30. A pulse-duty factor ldtvm of 100% means that the vacuum unit 65 is at ambient pressure pu and the valve 60 is therefore closed. Oppositely, at a pulse-duty factor ldtvm of 0%, the charging pressure actual value pvdkds is applied to the vacuum unit 65 and the valve 60 is opened. Accordingly, and in dependence upon the pulse-duty factor ldtvm, any desired pressure between the ambient pressure pu and the charging pressure actual value pvdkds can be applied to the vacuum unit 65. The valve 60 can assume any desired degree of opening between being completely closed and being opened in dependence upon the particular pressure value at the vacuum unit 65.

Accordingly, the exhaust-gas flow through the bypass can be adjusted via the pulse-duty factor ldtvm and therefore the compressor pressure ratio of the compressor 45 of the exhaust-gas turbocharger 1. In this way, the charging pressure actual value pvdkds can be adjusted in correspondence to the charging pressure desired value plsoll via the pulse-duty factor ldtvm. The pulse-duty factor ldtvm is therefore a suitable output variable or control variable of an arrangement 10 for controlling the charging pressure of the exhaust-gas turbocharger 1. The arrangement 10 is shown in FIG. 1 and the charging pressure actual value pvdkds and the charging pressure desired value plsoll are supplied to the arrangement 10 as input variables. An engine control (not shown in FIG. 1) determines a driver command torque from the accelerator pedal angle. This driver command torque is converted, for example, into the charging pressure desired value plsoll via a torque structure.

According to the invention, the control of charging pressure of the exhaust-gas turbocharger 1 is carried out by means of the arrangement 10 also in dependence upon the charging pressure plezv of the electric auxiliary charger 5 coacting with the exhaust-gas turbocharger 1 for compressing the inducted air. For this reason, additional input variables, such as the air mass flow ml, the rpm nezv of the motor 40 of the electric auxiliary charger 5 and the ambient pressure pu, are all supplied to the arrangement 10.

Figure 2:
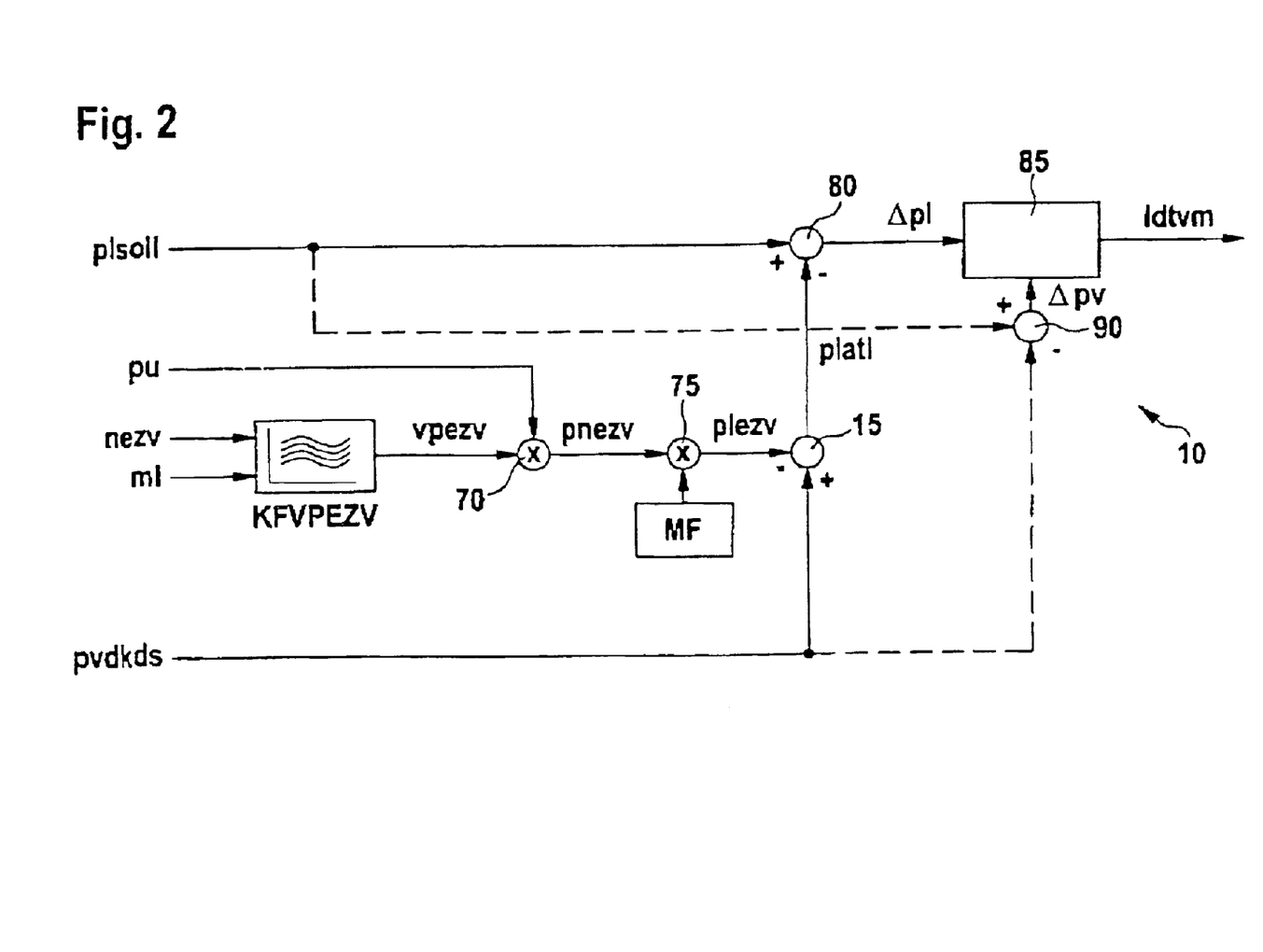
FIG. 2 is a sequence diagram for a first embodiment of the charging pressure control.

In FIG. 2, the arrangement 10 is explained with respect to a block circuit diagram which can, at the same time, also be interpreted as a sequence diagram.

With the known rpm nezv of the motor 40 of the electric auxiliary charger 5 and the measured air mass flow ml, the pressure ratio vpezv across the electric auxiliary charger 5 can be determined with a compressor characteristic field KFVPEZV. When this pressure ratio vpezv is multiplied by the ambient pressure pu in a first logic point 70, then one obtains the pressure pnezv at the outlet of the electric auxiliary charger 5. Alternatively, and in lieu of the ambient pressure pu, the pressure can also be used which is determined at the inlet of the electric auxiliary charger 5 via measurement or modeling. This is especially then necessary when the electric auxiliary charger 5 is not connected forward of the exhaust-gas turbocharger 1 as in FIG. 1, but is connected downstream thereof.

The pressure pnezv can be measured directly at the output of the electric auxiliary charger 5 in lieu of a mathematical determination of this pressure at the outlet of the electric auxiliary charger 5 with the aid of the compressor characteristic field KFVPEZV and the first logic position 70.

A regenerative feedback effect with the exhaust-gas turbocharger 1 arises with the use of the electric auxiliary charger 5. In this way, the exhaust-gas turbocharger 1 supplies a higher pressure ratio at a viewed operating point of the engine 25 or at a viewed operating point of the electric auxiliary charger 5 and the exhaust-gas turbocharger 1 than it would without the electric auxiliary charger 5. The regenerative feedback effect can be considered, as shown in FIG. 2. via a multiplication of the pressure pnezv at the output of the electric auxiliary charger 5 by a regenerative feedback factor MF at a second logic position 75. The regenerative feedback factor MF can be selected as a fixed value and can, for example, assume the value 1.5. It is also conceivable to adapt the regenerative feedback factor MF to the particular operating point of the engine 25 or of the electric auxiliary charger 5 and of the exhaust-gas turbocharger 1, especially, via a characteristic field and, in this way, to achieve a consideration as accurately as possible of the regenerative feedback effect for several operating points. The pressure plezv, which results after the multiplication in the second logic position 75, then defines the component of the charging pressure which results because of the switched-on or activated electric auxiliary charger 5 and is identified in the following as the charging pressure plezv of the electric auxiliary charger 5. This charging pressure plezv of the electric auxiliary charger 5 is subtracted from the charging pressure actual value pvdkds at a third logic position 15. The charging pressure actual value pvdkds is, in each case, the charging pressure actual value ahead of the throttle flap 30 and is independent of the seguence of the electric auxiliary charger 5 and the exhaust-gas turbocharger 1 after the electric auxiliary charger 5 and the exhaust-gas turbocharger 1. As a result of the subtraction in the third logic point 15, the charging pressure actual value platl results, which is modified by the charging pressure plezv of the electric auxiliary charger 5. The modified charge pressure actual value platl defines the portion of the charging pressure actual value pvdkds which is achieved exclusively because of the exhaust-gas turbocharger l. At a fourth, logic position 80, the modified charging pressure actual value platl is subtracted from the charging pressure desired value plsoll. The first difference value $\Delta$pl which forms is supplied to a controller 85. Furthermore, a fifth logic position 90 is provided to which the charging pressure desired value plsoll and the charging pressure actual value pvdkds are supplied. At the fifth logic position, the charging pressure actual value pvdkds is subtracted from the charging pressure desired value plsoll. A second difference value $\Delta$pv results as a difference and is likewise supplied to the controller 85. The output signal of the controller 85 is the pulse-duty factor ldtvm.

For the case that the first difference value $\Delta$pl is positive and the second difference value $\Delta$pv is positive, the controller 85 increases the pulse-duty factor, if possible, in order to reduce the degree of opening of the valve 60 and to increase the exhaust-gas flow through the turbine 50. The object is to cause the charging pressure actual value pvdkds to track the charging pressure desired value plsoll and to control the second difference value $\Delta$pv toward zero.

For the case that the first difference value $\Delta$pl is greater than zero and the second difference value $\Delta$pv is less than zero, the controller 85 reduces the pulse-duty factor ldtvm and thereby increases the degree of opening of the valve 60 in order to reduce the exhaust-gas flow through the turbine 50 and therefore also to reduce the charging pressure actual value pvdkds. In this way, the charging pressure actual value pvdkds is likewise caused to track the charging pressure desired value plsoll and the second difference value Δpv is controlled toward zero.

For the case that the first difference value Δpl is less than or equal to zero and the second difference value Δpv is less than zero, the controller 85 can output a further signal (not shown in FIG. 2) which effects a switchoff of the motor 40 and therefore of the electric auxiliary charger 5. In this case, the modified charging pressure actual value platl, and therefore the exclusive influence of the exhaust-gas turbocharger 1, is sufficient in order to adjust the charging pressure desired value plsoll. To save energy, the electric auxiliary charger 5 can be switched off as described. If the first difference value Δpl is less than zero, then the pulse-duty factor ldtvm is reduced by the controller 85 in order to increase the degree of opening of the valve 60 and to reduce the charging pressure actual value pvdkds with the object that the modified charging pressure platl tracks the charging pressure desired value plsoll and to control the first difference value Δpl toward zero. In this case, the modified charging pressure actual value platl corresponds to the charging pressure actual value pvdkds because the electric auxiliary charger 5 was switched off and the charging pressure plezv of the electric auxiliary charger is equal to zero. Furthermore, the first difference value Δpl corresponds, in this case, to the second difference value Δpv. The first difference value Δpl functions therefore only to check whether the electric auxiliary charger 5 can be switched off (namely, for Δpl less than zero) or must remain switched on (namely, for Δpl greater than zero). The evaluation of the first difference value Δpl takes place according to FIG. 2 in controller 85 but could take place separately from the controller, namely, in its own comparison module, which outputs, as an output signal, a signal for activating or deactivating the electric auxiliary charger 5 or the motor 40. In contrast, the second difference value Δpv is the actual input quantity of the controller 85 which is intended to be controlled to zero via the output of a corresponding pulse-duty factor ldtvm. This control can take place, for example, by means of a PID controller. With the arrangement 10, it is therefore guaranteed that, on the one hand, the valve 60 is adjusted closed and the electric auxiliary charger 5 is not activated unnecessarily.

The subtraction of the charging pressure actual value pvdkds from the charging pressure desired value plsoll in the fifth logic position 90 is provided only for the case wherein the electric auxiliary charger 5 or the motor 40 is driven at constant rpm nezv. For the case wherein the rpm nezv of the motor 40 of the electric auxiliary charger 5 is variable and has its own rpm control, the fifth logic position 90 is no longer required. The actual and the single input quantity of the controller 85 is then the first difference value Δpl. The controller 85 can, for example, again be configured as a PID controller.

If the first difference value Δpl is greater than zero, then the controller 85 triggers an increase of the pulse-duty factor LTDVM in the event that this does not already amount to 100%. By increasing the pulse-duty factor LTDVM, the degree of opening of the valve 60 is reduced insofar as this valve 60 is not already closed. In this way, the modified charging pressure actual value platl is increased and tracks the charging pressure desired value plsoll. If the valve 60 is completely closed and the pulse-duty factor ldtvm is therefore 100%, then a further increase of the modified charging pressure actual value platl is not possible. If the charging pressure desired value plsoll is then still greater than the modified charging pressure actual value platl, then this difference can no longer be reduced by the above-described PID controller. A further tracking of the charging pressure actual value pvdkds to the charging pressure desired value plsoll is then only possible via the control of the rpm nezv of the electric auxiliary charger 5, that is, in this case, by increasing the rpm nezv of the electric auxiliary charger 5.

For the case wherein the first difference value Δpl is less than zero, the controller 85 triggers a reduction of the pulse-duty factor ldtvm and therefore an increase of the degree of opening of the valve 60 with the object to reduce the modified charge pressure actual value platl and to control to the charging pressure desired value plsoll and to control the first difference value Δpl toward zero. Independently of this, the electric auxiliary charger 5 is controlled downwardly in its rpm nezv by the rpm control of the electric auxiliary charger 5 (not shown in FIG. 1) in order that the charging pressure actual value pvdkds tracks the charging pressure desired value plsoll.

In this way, and in the event of a variable rpm nezv of the electric auxiliary charger 5, the advantage is effected that the control of the degree of opening of the valve 60 can be realized because of the modified charging pressure actual value platl while considering the charging pressure plezv of the electric auxiliary charger 5 so that, for an activated or switched on auxiliary charger 5, the degree of opening of the valve 60 is not increased unnecessarily. The degree of opening of the valve 60 is adjusted thereby to the minimal required value.

Figure 3:
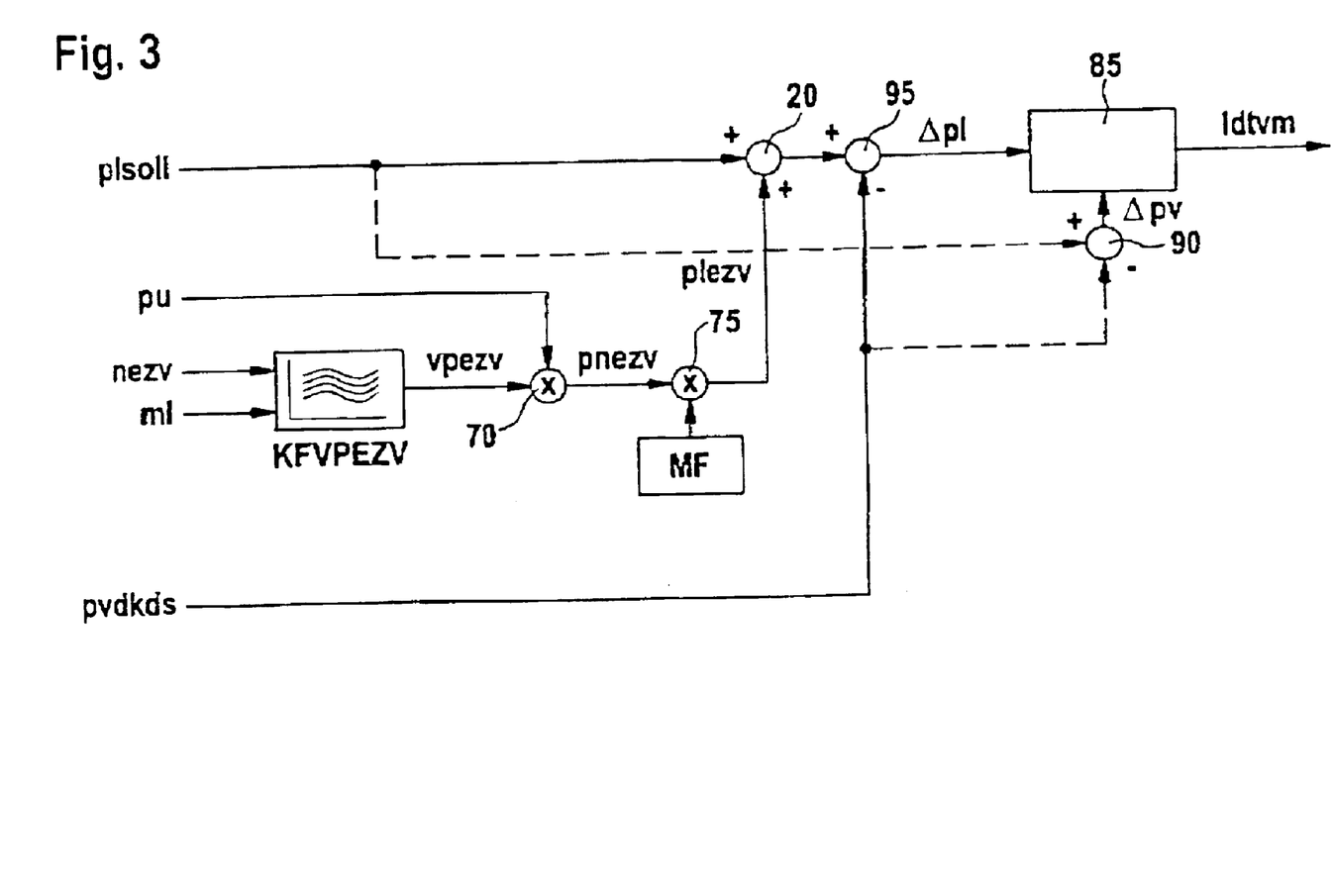
FIG. 3 is a sequence diagram for a second embodiment of the charging pressure control.

In a further embodiment of FIG. 3, the same reference numerals identify the same elements as in the first embodiment of FIG. 2. The configuration of the block circuit diagram in the second embodiment of FIG. 3 differs from the block circuit diagram of FIG. 2 only in that the charging pressure plezv of the electric auxiliary charger 5 in the block circuit diagram of FIG. 3 is not coupled anymore to the charging pressure actual value pvdkds but is additively coupled with the charging pressure desired value plsoll at a sixth logic position 20. The third logic position 15 of FIG. 2 is therefore not necessary in the block circuit diagram of FIG. 3. From the sum formed in the sixth logic position 20, the charging pressure actual value pvdkds is subtracted in a seventh logic position 95 so that, at the output of the seventh logic position 95, the first difference value Δpl again results. In this way, the operation of the block circuit diagram of the second embodiment of FIG. 3 is equal to the operation of the first embodiment of FIG. 2. With the second embodiment of FIG. 3, it can be purposeful for increasing control loop stability to apply the desired rpm nezvdes and the air mass desired value mlsoll instead of the measured values for the rpm nezv of the motor 40 and the air mass ml.

In a further embodiment, it can be provided that the charging pressure in the operating range of the electric auxiliary charger 5 is controlled exclusively via the rpm of the electric auxiliary charger 5. The exhaust-gas turbocharger 1 is precontrolled in this operating range of the electric auxiliary charger 5 so that no unwanted interchange takes place between the control of the exhaust-gas turbocharger 1 and the control of the electric auxiliary charger 5. This means that at least one of the controller components of the PID controller or a precontrol of the exhaust-gas turbocharger 1 is controlled in such a manner that the pulse-duty factor ldtvm is almost or equal to 100%. The PID controller is used by way of example for the control of the compressor pressure ratio across the compressor 45 of the exhaust-gas turbocharger 1 and the precontrol of the exhaust-gas turbocharger 1 is independent of the PID controller of the exhaust-gas turbocharger 1. In this way, the valve 60 is closed and the charging pressure actual value pvdkds tracks the charging pressure desired value plsoll only via control of the rpm nezv of the motor 40 of the electric auxiliary charger 5.

In this way, the charging pressure of the exhaust-gas turbocharger 1 is controlled in such a manner in dependence upon the charging pressure plezv of the electric auxiliary charger 5 so that, during the operation of the electric auxiliary charger 5 (that is, while the electric auxiliary charger 5 is activated), the pulse-duty factor ldtvm for the exhaust-gas turbocharger 1 is adjusted to almost or equal to 100%. In this way, an unnecessary opening of the valve 60 during operation of the electric auxiliary charger 5 is likewise avoided.

Figure 4:
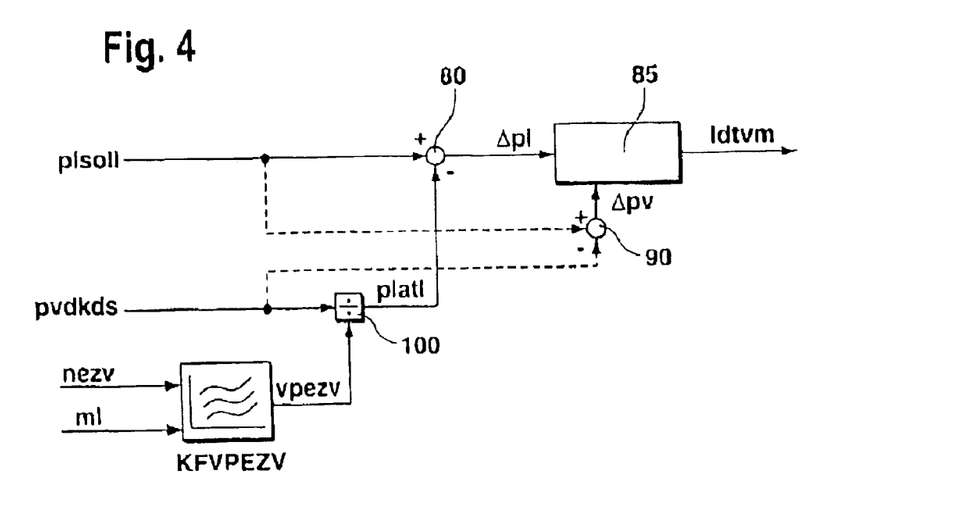
FIG. 4 is a sequence diagram for a third embodiment of the charging pressure control.

In a further embodiment of FIG. 4, the same reference numerals identify the same elements as in FIG. 2. In contrast to FIG. 2, however, the charging pressure actual value platl is computed in a simpler manner in that the charging pressure actual value pvdkds is divided by the compressor pressure ratio vpezv of the electric auxiliary charger in a division element 100. The charging pressure actual value platl is modified by the charging pressure plezv of the electric auxiliary charger 5. Otherwise, the sequence diagram of FIG. 4 corresponds to the sequence diagram of FIG. 2. In lieu of the determination of the pressure ratio vpezv of the electric auxiliary charger 5 by means of the compressor characteristic field KFVPEZV, a measurement of the pressure pnezv can take place at the output of the electric auxiliary charger 5. When this pressure is divided by the ambient pressure pu, then one obtains the compressor pressure ratio vpezv of the electric auxiliary charger 5. Alternatively, and in lieu of the measured rpm nezv of the motor 40 of the electric auxiliary charger 5 and the measured air mass flow ml, the desired value nezvdes for the rpm of the motor 40 of the electric auxiliary charger 5 and the desired value mlsoll for the air mass flow can be used. The desired values nezvdes and mlsoll are computed by the engine control of the engine 25 in the manner known per se to the engineers working in the area of controlling the charging pressure of an exhaust-gas turbocharger.

Figure 5:
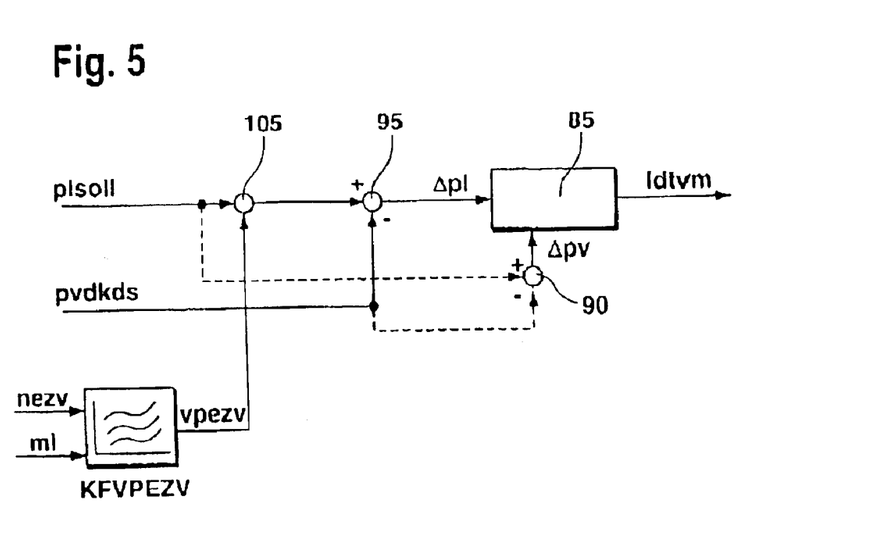
FIG. 5 is a sequence diagram for a fourth embodiment of the charging pressure control; and, FIG. 6 is a sequence diagram for a fifth embodiment of the charging pressure control.

In a further embodiment of FIG. 5, the same reference numerals identify the same elements in FIG. 3. Here, in contrast to FIG. 3, however, the charging pressure desired value plsoll is multiplied by the compressor pressure ratio vpezv in a multiplying element 105 and, in the seventh logic position 95, the charging pressure actual value pvdkds is subtracted from this product in the same manner as the example of FIG. 3. The sequence diagram of FIG. 5 corresponds otherwise to the sequence diagram of FIG. 3.

In the described embodiments, the charging pressure plezv or the compressor pressure ratio vpezv of the electric auxiliary charger 5 was used as a characteristic variable of the electric auxiliary charger 5 in order to control the charging pressure of the exhaust-gas turbocharger 1 or to correct an input variable of the control.

Figure 6:
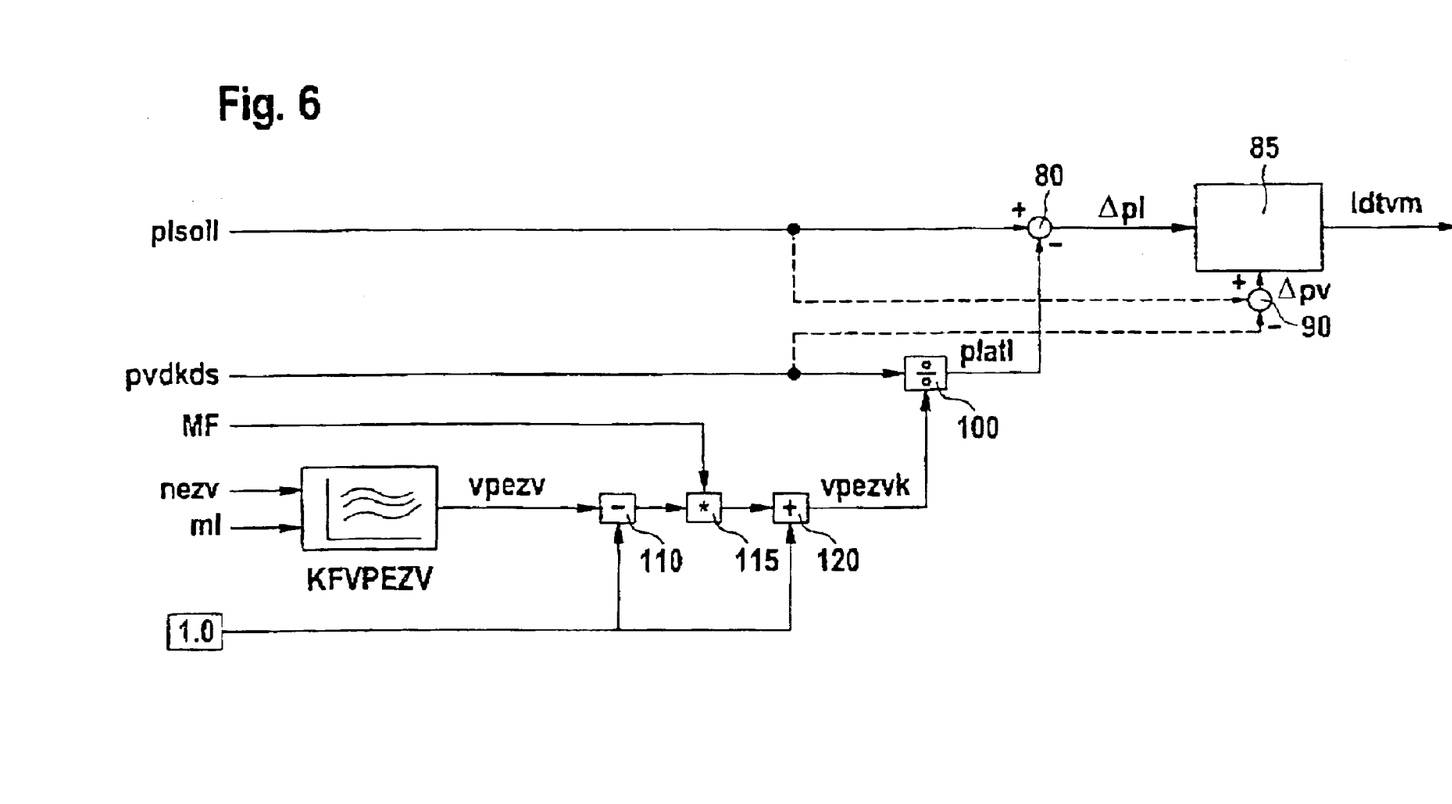

In FIG. 6, a fifth embodiment of the charge pressure control of the invention is shown wherein, and proceeding from the third embodiment of FIG. 4, the same reference numerals are used to identify the same elements. Proceeding from the third embodiment of FIG. 4, the fifth embodiment of FIG. 6 additionally includes a subtraction member 110 wherein the compressor pressure ratio vpezv of the electric auxiliary charger 5 is reduced by the value 1. The compressor pressure ratio vpezv−1, which is reduced in this manner, is thereafter multiplied in a multiplication member 115 by the regenerative feedback factor MF. In this way, only the pressure increase of the electric auxiliary charger 5 is multiplicatively increased by means of the regenerative feedback factor MF, whereby the fact of the regenerative feedback of the exhaust-gas turbocharger 1 with the electric auxiliary charger 5 is taken into account. The multiplication result is thereafter again increased by 1 in an addition member 120 so that, at the output of the addition member 120, a compressor pressure ratio vpezvk of the electric auxiliary charger 5 results which is corrected in dependence upon the regenerative feedback factor MF. This ratio vpezvk is then supplied to the division member 100 as in the third embodiment of FIG. 4.

This application claims priority from the following German patent applications: 102 03 982.8, filed Jan. 31, 2002; 102 47 898.8, filed Oct. 14, 2002; and, 103 02 453.0, filed Jan. 23, 2003. The content of all three German patent applications on which priority is claimed herein is incorporated herein by reference.

It is understood that the foregoing description is that of the preferred embodiments of the invention and that various changes and modifications may be made thereto without departing from the spirit and scope of the invention as defined in the appended claims.

What is claimed is:

1. A method for controlling the charge pressure of an exhaust-gas turbocharger, the method comprising the steps of:

causing a charge pressure actual value (pvdkds) to track a charge pressure desired value (plsoll);

controlling the charge pressure of said exhaust-gas turbocharger in dependence upon a characteristic quantity of an electric auxiliary charger coacting with said exhaust-gas turbocharger to compress the inducted air; and, using the charge pressure (plezv) of said electric auxiliary charger as said characteristic quantity.

2. The method of claim 1, wherein said electric auxiliary charger is switched off when said charge pressure desired value (plsoll) is exceeded by said charge pressure actual value (platl); and, said charge pressure actual value (platl) is modified by said charge pressure (plezv) of said electric auxiliary charger.

3. The method of claim 1, wherein an input quantity of the control is corrected by the charge pressure (plezv) of said electric auxiliary charger.

4. The method of claim 3, wherein said charge pressure actual value (pvdkds) is corrected by subtracting said charge pressure (plezv).

5. The method of claim 3, wherein said charge pressure desired value (plsoll) is corrected by adding said charge pressure (plezv) of said electric auxiliary charger.

6. A method for controlling the charge pressure of an exhaust-gas turbocharger, the method comprising the steps of:

causing a charge pressure actual value (pvdkds) to track a charge pressure desired value (plsoll);

controlling the charge pressure of said exhaust-gas turbocharger in dependence upon a characteristic quantity of an electric auxiliary charger coacting with said exhaust-gas turbocharger to compress the inducted air; and, using said compressor pressure ratio (vpezv) of said electric auxiliary charger as said characteristic quantity.

7. The method of claim 6, wherein an input quantity of the control is corrected with said compressor pressure ratio (vpezv) of said electric auxiliary charger.

8. The method of claim 7, wherein said charge pressure actual value (pvdkds) is corrected by division of said compressor pressure ratio (vpezv) of said electric auxiliary charger.

9. The method of claim 7, wherein said charge pressure desired value (plsoll) is corrected by multiplication of said compressor pressure ratio (vpezv) of said electric auxiliary charger.

10. A method for controlling the charge pressure of an exhaust-gas turbocharger, the method comprising the steps of:

causing a charge pressure actual value (pvdkds) to track a charge pressure desired value (plsoll);

controlling the charge pressure of said exhaust-gas turbocharger in dependence upon a characteristic quantity of an electric auxiliary charger coacting with said exhaust-gas turbocharger to compress the inducted air; and, closing a bypass, which is connected in parallel with the turbine of said exhaust-gas turbocharger, as long as said electric auxiliary charger is activated.

\* \* \* \* \*